P. E. BRAUER.
MUFFLER.
APPLICATION FILED AUG. 13, 1915.

1,163,128.

Patented Dec. 7, 1915.

Inventor
Paul E. Brauer
by (attorney signature)
Attorney

UNITED STATES PATENT OFFICE.

PAUL E. BRAUER, OF RIDGEWAY, NORTH CAROLINA.

MUFFLER.

1,163,128. Specification of Letters Patent. Patented Dec. 7, 1915.

Application filed August 13, 1915. Serial No. 45,298.

*To all whom it may concern:*

Be it known that I, PAUL E. BRAUER, a citizen of the United States, residing at Ridgeway, in the county of Warren and State of North Carolina, have invented certain new and useful Improvements in Mufflers, of which the following is a specification.

This invention relates to exhaust mufflers, particularly adapted and intended for use on the exhaust pipe of an internal combustion engine, the object being to provide a muffler of cheap and simple construction which will effectively decrease the shock and noise of the exhaust, and allow the products of combustion to escape gradually from the exhaust passages. This object is effected by means of a valve located in a chamber connected to the exhaust pipe, which valve tends to close under the shock of the explosion, thereby decreasing the force of the discharge, and permitting a gradual escape as the valve resumes its open position after each explosion.

The invention is illustrated in the accompanying drawing, in which—

Figure 1:
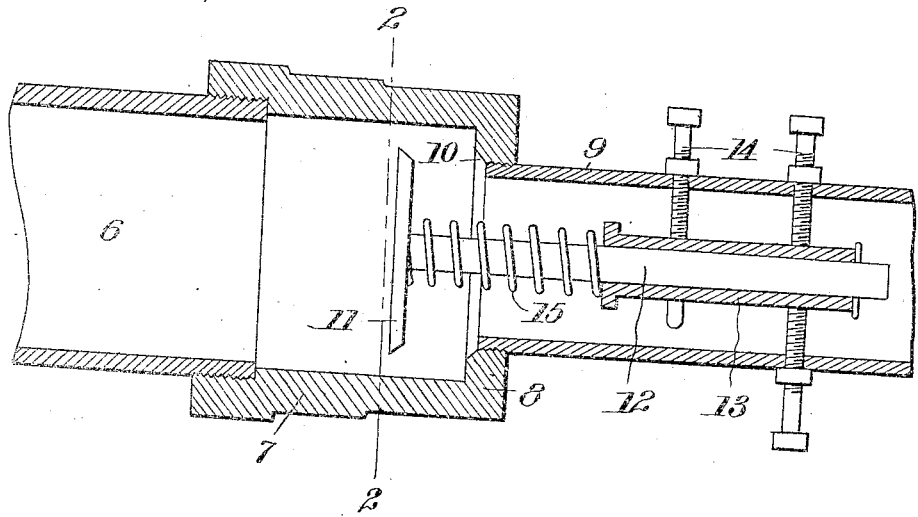
Figure 2:
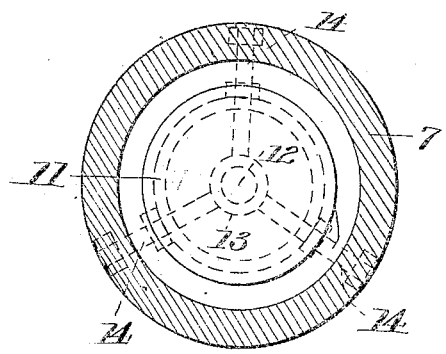

Figure 1 is a longitudinal section of the muffler. Fig. 2 is a cross section on the line 2—2 of Fig. 1.

Referring specifically to the drawings, 6 indicates the exhaust pipe of the engine, to the end of which is screwed a cylindrical casing 7, the outer end of which is reduced as indicated at 8 and threaded to receive a smaller outlet pipe 9. A valve seat is formed at 10, around the mouth of the pipe 9. A disk valve 11 closes against this seat, and has a stem 12 which works in a guide tube 13 supported in the pipe 9 by means of screws 14 or the like. A spring 15 is coiled around the stem between the head of the valve and the end of the tube 13, and this spring tends to hold the valve in open position.

In operation, the exhaust passes from the pipe 6 into the casing 7, and the shock thereof against the valve 11 closes, or partly closes, the same, against the pressure of the spring 15, thereby confining, to a certain extent, the exhaust gases, and after the first shock the decrease of pressure permits the spring 15 to gradually open the valve 11, allowing the gases to gradually escape, with but little noise. The device therefore provides a yielding valve tending to close under the shock of the exhaust, and gradually opening, producing a fairly continuous and even flow of the gases from the outlet, thereby reducing the vibration and noise incident to an intermittent and uninterrupted escape. The strength of the spring 15 is proportioned to the size or power of the engine, and the device operates automatically for the intended purpose.

I claim:

1. A muffler comprising an enlarged casing connected to the exhaust pipe, an outlet from the casing, of smaller diameter than the exhaust pipe, a yielding check valve controlling the mouth of the outlet pipe and tending to close under exhaust pressure and to open as said pressure falls, and a guide in the outlet pipe, for the valve.

2. A muffler comprising a casing connected at one end to an exhaust pipe, an outlet pipe from the opposite end of the casing, and in axial alinement with the exhaust pipe, a tubular guide in the outlet pipe, a check valve working in the casing and controlling the mouth of the outlet pipe, having a stem working in said guide, and a spring coiled around said stem between the guide and the head of the valve.

In testimony whereof, I affix my signature in presence of two witnesses.

PAUL E. BRAUER.

Witnesses:
OTTO BRAUER,
J. E. BAUZOT.